F. W. HUBER & R. W. POINDEXTER, Jr.
PROCESS OF PRODUCING ALKALINE EARTH METAL COMPOUNDS.
APPLICATION FILED JULY 6, 1914.
1,213,375.  Patented Jan. 23, 1917.
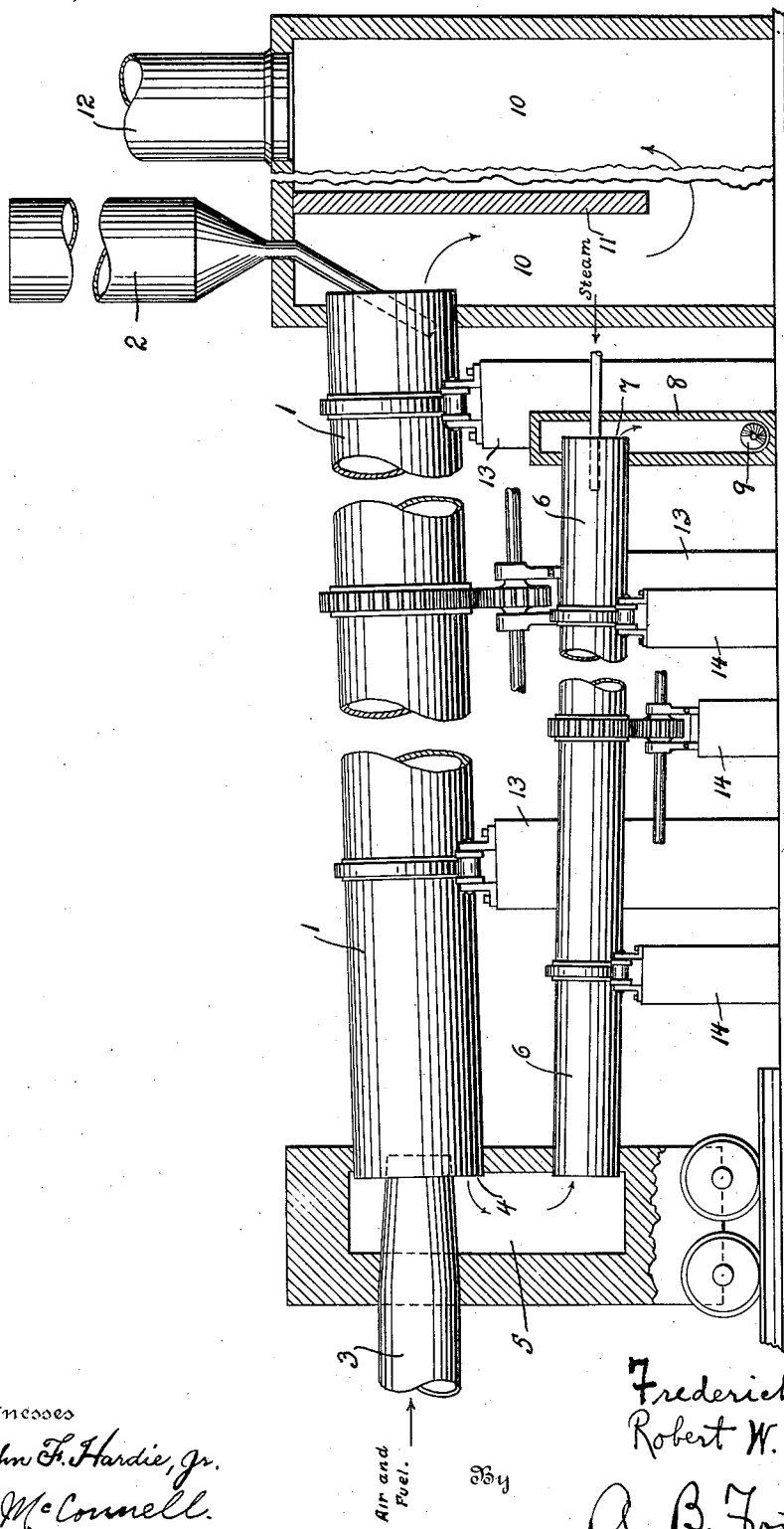

UNITED STATES PATENT OFFICE.

FREDERICK W. HUBER AND ROBERT W. POINDEXTER, JR., OF LOS ANGELES, CALIFORNIA.

PROCESS OF PRODUCING ALKALINE-EARTH-METAL COMPOUNDS.

1,213,375.         Specification of Letters Patent.      Patented Jan. 23, 1917.

Application filed July 6, 1914. Serial No. 849,314.

*To all whom it may concern:*

Be it known that we, FREDERICK W. HUBER and ROBERT W. POINDEXTER, Jr., both citizens of the United States, residing at Los Angeles, California, have invented certain new and useful Improvements in Processes of Producing Alkaline-Earth-Metal Compounds, of which the following is a specification.

Our present invention relates to the production of alkaline earth metal compounds, particularly strontium oxid or hydroxid, from strontium sulfate, which may be in the form of celestite, which is a mineral appearing in relatively large quantities and which has heretofore not been extensively utilized.

It has been suggested to use strontium oxid or hydroxid in place of lime, in the sugar industry, but heretofore such a process, while simplifying some of the steps of the sugar industry, was not commercially feasible, on account of the high cost of strontium compounds. In our process, we can greatly reduce the cost of producing strontia from celestite.

We have found that when finely ground strontium sulfate is heated in a reducing flame, to a temperature of from 1200 to 1300° C., the strontium sulfate is reduced to strontium sulfid, which strontium sulfid can be utilized for any desired purpose, for example for the production of strontium hydroxid, which latter operation may be readily performed by treating the strontium sulfid at a high temperature with steam.

The process may be carried out in an apparatus such as is shown in the accompanying drawing, however, we call attention to the fact that various other forms of apparatus may be employed in carrying out the process.

The figure illustrates a side view, partially in section, of an apparatus suitable for use in carrying out the process.

In said drawing 1 illustrates a rotary inclined kiln of the type commonly employed in the manufacture of Portland cement and similar material.

2 represents a hopper through which the celestite or other strontium sulfate, or other alkaline earth sulfate is introduced into the upper end of the inclined furnace 1, 3 illustrates a suitable burner through which fuel and air are introduced in the form of a blast, for the production of the necessary reducing flame.

The material introduced from the hopper 2 after traveling downwardly through the inclined kiln 1, is discharged at 4, into a space 5 inclosing the lower end of this kiln, and thence into and through a second inclined rotary kiln 6, in which it is treated with steam, at a temperature sufficiently high to convert the strontium sulfid, or other alkaline earth sulfid into oxid or hydroxid. This temperature may if desired be in the vicinity of 800° C., and since the sulfid enters the kiln 6 at a temperature of substantially 1200° C., no particular difficulty is found in maintaining the desired high temperature in the kiln 6. At 7 the finished product is discharged into a casing 8, in which it may be allowed to cool sufficiently, after which it may be removed, by means for example of a helical conveyer 9, to a suitable leaching and purifying apparatus, or to the storage bin, or elsewhere.

In the inclined furnace 6, the steam reacts with the sulfid, to produce strontium oxid or hydroxid and hydrogen sulfid, the latter travels back into the chamber 5, and thence through the kiln 1, thereby aiding in maintaining the reducing atmosphere, in the kiln 1.

During the passage of the hydrogen sulfid through the inclined kiln 1, it is partly burned, to produce free sulfur, which free sulfur will be in the form of vapor, and will largely condense out in the dust chamber 10, which may be of any suitable dimensions, and which may be provided with suitable number of baffles 11, in order to cause the gases to assume a tortuous course. The gases may pass to any suitable gas washer, etc., if desired. The sulfur obviously forms a valuable by-product. The waste gases, after the bulk of the sulfur has settled out, pass by means of a connection 12, to the stack or chimney, or to a gas washer.

It will be obvious that suitable rotating means for the kilns 1 and 6 will be provided, mounted on the standards 13 and 14 respectively.

In the production of the requisite high temperature, the air used in the blast may be preheated if desired, by the waste heat of the exit gases, or otherwise, thereby effecting a saving of fuel.

The strontium sulfate will preferably be ground to a powder before being introduced into the kiln. The degree of fineness will determine the temperature necessary in the kiln 1, and the length of time necessary to effect the reduction of sulfate to sulfid.

The steam, in its passage through the kiln 6, will become highly superheated by the hot strontium sulfid, which greatly facilitates the reaction between these two materials.

We are aware that strontium sulfate has heretofore been mixed with a reducing agent, such as coal, and heated in a muffle furnace to a temperature of 600 to 800° C., for the purpose of reducing the sulfate to sulfid, but we call attention to the fact that in our process, no reducing agent is mixed with the strontium sulfate, other than the reducing flame introduced through the burner 3. The reducing flame may be produced by the combustion of powdered coal, oil, gas, or other carbonaceous fuel.

While we have described a certain preferred form of apparatus, we call attention to the fact that other suitable apparatus may be employed, without departing from the scope of the invention.

We call attention to the fact that the process being continuous, effects a material saving in the amount of fuel necessary, for carrying out the process, also effects a material saving in the cost of the initial plant, for the reason that in the continuous process a large yield can be secured.

What we claim is:—

1. A process of producing a sulfid of an alkaline earth metal, which comprises subjecting the sulfate of such a metal, free from admixture with solid fuel, to a reducing flame, at a temperature of about 1200 to 1300° C.

2. A process of producing strontium sulfid, which comprises, subjecting strontium sulfate, in a comminuted form to the action of a reducing flame, at a temperature of about 1200 to 1300° C.

3. A process of producing strontium-oxygen compounds, which comprises subjecting strontium sulfate to the action of a reducing flame, at a temperature of about 1200 to 1300° C., and thereafter subjecting the hot strontium sulfid, thereby produced, and while still in a highly heated condition, to the action of superheated steam.

4. A process of producing alkaline earth metal compounds, which comprises subjecting comminuted alkaline earth metal sulfate, to the action of a reducing flame at a temperature materially above a red heat, thereafter subjecting the alkaline earth metal sulfid to the action of steam, at a high temperature, and bringing the gaseous product of said second reaction into contact with the material treated in said first step, to aid in maintaining a reducing atmosphere in said first step.

5. A continuous process of producing strontium-oxygen compounds, which comprises subjecting strontium sulfate, in the form of a moving agitated mass, to contact with a reducing flame, at a temperature of about 1200 to 1300° C., subjecting the hot strontium sulfid thereby produced to the action of steam, and passing the hydrogen sulfid produced in said second step, into contact with the materials treated in the first step, to aid in maintaining a reducing atmosphere in said first step.

6. A process of reducing sulfates to sulfids, which comprises subjecting the sulfate unmixed with solid fuel to the action of a reducing flame, at a temperature materially above a red heat.

7. A process of reducing aklaline earth metal sulfates, which comprises heating the same to a temperature materially above redness, by means of a reducing flame, while passing the same through an inclined rotary kiln.

8. A process of reducing alkaline earth metal sulfates which comprises bringing a moving agitated current of such a sulfate into counter current contact with a reducing flame, capable of heating said sulfate to a temperature materially above a red heat.

In testimony whereof, I, F. W. Huber, have affixed my signature in presence of two witnesses.

FREDERICK W. HUBER.

Witnesses:
J. Herbert Johnston,
Edward E. Johnston.

In testimony whereof I, R. W. Poindexter, Jr., have affixed my signature in presence of two witnesses.

ROBERT W. POINDEXTER, Jr.

Witnesses:
Harry P. Hood,
Lucius P. Green.